United States Patent [19]

MacDonald II

[11] Patent Number: 4,652,960
[45] Date of Patent: Mar. 24, 1987

[54] FLEXIBLE DISK RECORDING AND/OR REPRODUCING APPARATUS

[75] Inventor: John C. MacDonald II, Rochester, N.Y.

[73] Assignee: Eastman Kodak Company, Rochester, N.Y.

[21] Appl. No.: 762,742

[22] Filed: Aug. 5, 1985

[51] Int. Cl.$^4$ ............................................. G11B 15/60
[52] U.S. Cl. ............................................. 360/130.34
[58] Field of Search ............................. 360/130.34, 99

[56] References Cited

U.S. PATENT DOCUMENTS

| | | | |
|---|---|---|---|
| 3,124,661 | 3/1964 | Trapp | 179/100.2 |
| 3,178,719 | 4/1965 | Shapiro | 346/74 |
| 3,731,292 | 5/1973 | Kelley | 340/174.1 E |
| 4,214,287 | 7/1980 | Stromsta | 360/103 |
| 4,466,032 | 8/1984 | Saito | 360/99 |

*Primary Examiner*—A. J. Heinz
*Attorney, Agent, or Firm*—Roger A. Fields

[57] ABSTRACT

A flexible magnetic disk is rotated at a relatively high speed to cause the disk to revolve substantially in a plane. A pair of elongate guides for the disk are mounted in a converging relation, which permits the guides to reside substantially along respective radii of the rotated disk. The guides penetrate the plane of the rotated disk substantially along the two radii, and therefore will deflect successive radial sectors of the disk from the plane as each of the sectors is rotated across a radially tapered space between the guides. A magnetic record and/or playback head is positioned to urge at least a portion of a radial sector of the disk, deflected from the plane, towards the tapered space to effect a reverse deflection of the portion in the vicinity of the head. Thus the reverse-deflected portion is substantially conformed with the radially directed forces along the rotated disk, thereby assuring an intimate and stable head-to-disk relation.

5 Claims, 4 Drawing Figures

FIG. 2
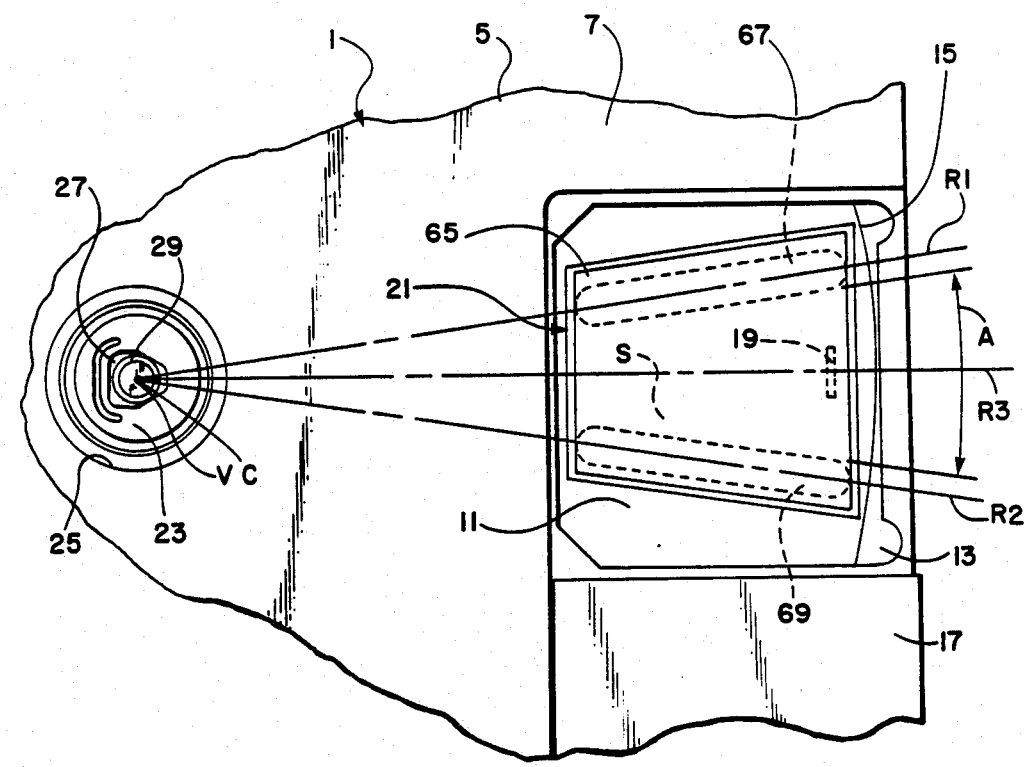
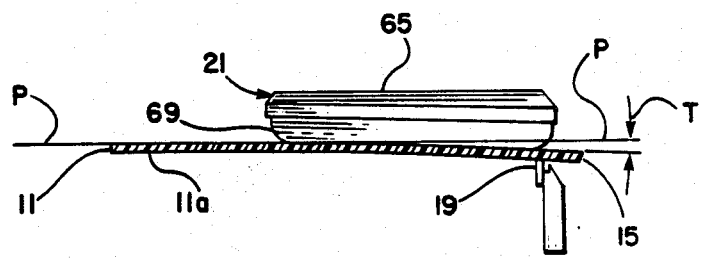
FIG. 3

FLEXIBLE DISK RECORDING AND/OR REPRODUCING APPARATUS

BACKGROUND OF THE INVENTION

1. Field of the Invention

The invention generally relates to a flexible disk recording and/or reproducing apparatus. More particularly, the invention relates to an improved apparatus for accurately positioning a rotated flexible disk with respect to a recording and/or reproducing head to record or reproduce information on the disk.

2. Description of the Prior Art

For successfully recording or reproducing information on a magnetic disk, particularly at high densities such as employed in video or computer equipment, the head-to-disk relation should remain substantially constant over a wide range of operating parameters. Variations in the head-to-disk relation can have a significant effect on the fringing flux pattern and therefore on the resolution of the sensing and recording of information on the magnetic disk. Unfortunately, with a magnetic disk, especially one that is flexible, as for example a floppy disk, the head-to-disk relation may be varied by the interaction of many parameters, such as temperature, humidity, relative speed between the disk and the head, penetration of the head into the disk, the contour of surfaces in the vicinity of the head or the disk, flexibility and variations in the thickness of the disk, the angles of attack and tilt of the head with respect to the disk, etc.

Various recording and/or reproducing apparatus have been proposed which seek to ensure a substantially constant relation between a flexible magnetic disk and a magnetic head during rotation of the disk. For example, in U.S. Pat. No. 3,178,719, a flexible magnetic disk supported in close proximity to a flat air bearing surface of an annular plate, usually referred to as a Bernoulli plate, is rotated at a relatively high speed with respect to the plate. This causes the rotated flexible disk to assume a stable planar position at a small distance from the air bearing surface. It is believed that the stable position results from a balance of the centrifugal and Bernoulli forces. A plurality of magnetic heads radially disposed with respect to the rotated flexible disk are embedded in the Bernoulli plate. The heads are either slightly above, slightly below, or flush with the air bearing surface. Since the close spacing between the air bearing surface and the rotated disk, and therefore the critical spacing between the magnetic heads and the rotated disk, varies as a function of the disk radius, a vacuum source is included to create a partial vacuum in respective round openings in the plate which each contain one of the heads. The partial vacuum deforms small annular areas of the flexible disk around the magnetic heads to independently control the close spacing between each of the heads and localized portions of the disk. This, it is asserted, maintains the head-to-disk spacing substantially constant and provides a close magnetic coupling between each head and the disk.

Although the recording apparatus disclosed in U.S. Pat. No. 3,178,719 may perform satisfactorily, it requires the use of a vacuum source to control the critical head-to-disk spacing. This significantly increases the construction and operating costs of such apparatus. A somewhat simpler recording apparatus that can deform small areas of a flexible disk around a magnetic head without the use of a vacuum source is disclosed in U.S. Pat. No. 3,731,292. In that apparatus, a flexible disk is rotated at a sufficient speed to cause the disk to revolve essentially in a plane. A magnetic head is moved radially inward across the rotated disk to record information on the disk. A finger member has a channel which extends the full length of travel of the head. The finger member is positioned in the plane of the rotated disk to cause successive portions of the disk crossing the channel to be deflected from the plane. At the same time, the head is located part way in the channel to cause a deflected portion of the disk to be reverse deflected into the channel. Thus the reverse deflected portion of the disk is deformed about the head. This, it is asserted, provides an intimate head-to-disk interface which assures a close magnetic coupling between the head and the disk.

One problem with the recording apparatus disclosed in U.S. Pat. No. 3,731,292 arises from the fact that the channel in the finger member has a uniform width. As a result, a deflected portion of the rotated disk which is reverse deflected into the channel is prevented by the parallel sides of the channel from conforming with the radially directed forces along the rotated disk. This appears to create an instability of the rotated disk in the vicinity of the magnetic head which will vary the head-to-disk spacing as the magnetic head is moved radially inward across the disk, thereby significantly affecting the resolution of the sensing and recording of information on the disk.

Another problem with the recording apparatus disclosed in U.S. Pat. No. 3,731,292 is that the rotated disk will seek to flare or deform increasingly away from the finger member in a radially outward direction, beginning at the innermost portion of the disk in contact with the finger member. Consequently, the rotated disk will be less stable proximate its outer edge than at an inner portion of the disk, and the head-to-disk spacing will therefore vary as the head is moved radially inward across the disk.

SUMMARY OF THE INVENTION

The invention solves the above-described problems existing in prior art magnetic recording and/or reproducing apparatus by accurately positioning the rotated flexible disk with respect to the record and/or playback head. Such accurate positioning is achieved by means of a pair of elongate guides for the disk which are mounted in a converging relation with an included acute angle defining a radially tapered space. This permits the guides to reside substantially along respective radii of the rotated disk. The guides are positioned to penetrate the plane of the rotated disk substantially along respective radii of the disk, to cause successive radial sectors of the disk rotated across the tapered space to be deflected from the plane. Conversely, the head may be positioned to urge at least a portion of the sector of the disk deflected from the plane towards the tapered space, to cause a reverse deflection of the portion in the vicinity of the head.

Owing to this improved arrangement, in particular, mounting the guides to include an acute angle which defines a radially tapered space, the area of the rotated disk in the vicinity of the head is substantially conformed with the radially directed forces along the disk. Thus a more intimate and stable head-to-disk interface is established as compared to prior art devices.

Preferably, the positioning means for the two guides locates the guides to penetrate the plane of the rotated disk increasingly towards the outer circumferential edge of the disk, along respective radii of the disk. That is to say, the guides are inclined at a negative tilt angle with respect to the plane of the disk. This provides a greater stability of the rotated disk proximate its outer circumferential edge, and therefore assures a more uniform head-to-disk relation radially across the disk than is provided in prior art devices.

BRIEF DESCRIPTION OF THE DRAWINGS

The invention will be described in connection with the drawings, wherein:

FIG. 2 is a top plan view of the radial guide positioned in one of the openings in the cartridge;

FIG. 3 is a side elevation view of the radial guide and the magnetic head disposed in contact with the respective surfaces of the flexible disk.

DESCRIPTION OF THE PREFERRED EMBODIMENT

Magnetic Disk Cartridge

Figure 1:
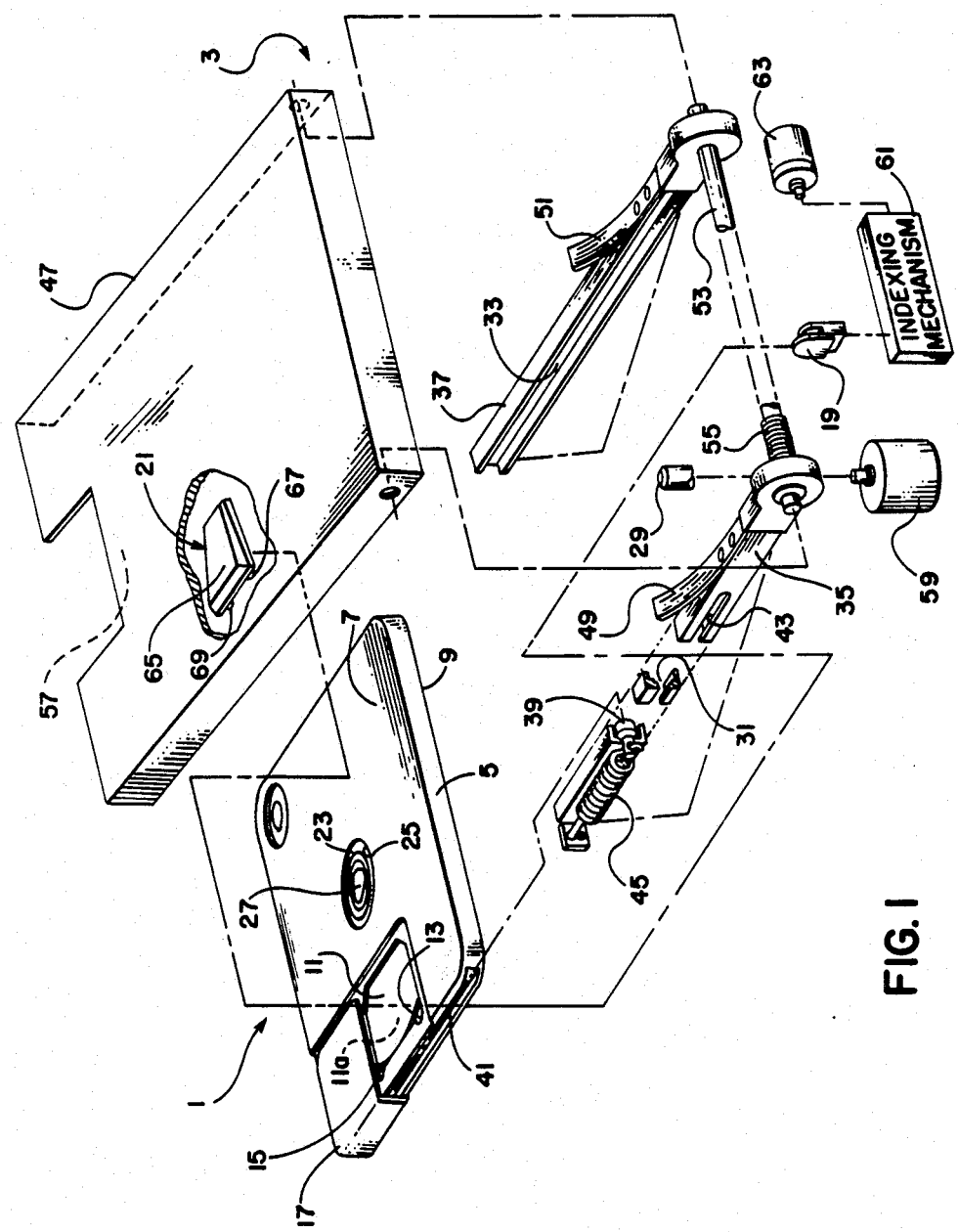
FIG. 1 is a perspective view of an improved recording and/or reproducing apparatus for use with a flexible disk cartridge in accordance with a preferred embodiment of the invention, illustrating the manner in which a magnetic head and a radial guide are positioned in respective openings in the cartridge to access opposite surfaces of the flexible disk.

Referring now to the drawings, and in particular to FIG. 1, there is shown a magnetic disk cartridge 1 intended for use in a flexible disk recording and/or reproducing apparatus 3. The cartridge 1, as described in detail in U.S. Pat. No. 4,466,032, granted Aug. 14, 1984, includes a substantially flat rectangular jacket 5 having opposed walls 7 and 9 between which a flexible disk 11 of magnetic material is freely rotatable. The respective walls 7 and 9 have aligned access-openings 13 which extend in the radial direction of the disk 11 slightly beyond the outer circumferential edge 15 of the disk and an inner annular recording limit of the disk. A double door member 17 of the cartridge 1 normally covers the aligned access-openings 13 to protect the disk 11. The door member 17 is slidable to an opened position in which exposes the openings 13, as shown in FIG. 1. When the door member 17 is opened, a magnetic head 19 in the apparatus 3 can extend through one of the openings 13 to access a record/playback surface 11a of the disk 11, and a radial guide 21 in the apparatus can extend through the other opening to access the opposite surface of the disk, as indicated in FIG. 1. A hub 23 is provided at the center of the disk 11, between respective aligned openings 25 in the opposed walls 7 and 9 of the jacket 5. The hub 23 has a hole 27 for receiving a drive shaft 29 in the apparatus 3 to rotate the disk 11 within the jacket 5. Other details of the cartridge 11 are described in U.S. Pat. No. 4,466,032.

Disk Recording and/or Reproducing Apparatus

FIG. 1 shows the manner in which the disk cartridge 1 may be inserted into the recording and/or reproducing apparatus 3. When the cartridge 1 is slid into a pair of substantially parallel, u-shaped channels 31 and 33 defined by respective pivot arms 35 and 37, a boss 39 located in the channel 31 will enter a guide groove 41 formed in an edge of the cartridge bridged by the double door member 17. Then, the door member 17 will be slid by the boss 39 to its opened position to uncover the aligned access-openings 13 in the opposed walls 7 and 9 of the cartridge 1. With continued movement of the cartridge 1 into the channels 31 and 33, the boss 39 will be pushed along a support slot 43 in the arm 35 in opposition to the normal urging of an eject spring 45. Finally, after completed movement of the cartridge 1 into the channels 31 and 33, releasable latch means, not shown, may be manually operated to secure the cartridge in place.

When a cover 47 which is biased away from the pivot arms 35 and 37 by respective leaf springs 49 and 51 on the arms is pushed downward, as viewed in FIG. 1, with the cartridge 1 secured in place, the cover will be pivoted about a supporting rod 53 in opposition to the leaf springs. The cover 47 will pivot against the two arms 35 and 37 and thereby will pivot the arms and the cartridge 1 in the same direction, in opposition to a torsion spring 55 coiled around the rod 53, until the cover comes to rest in a horizontal position against stop means, not shown. When the cover 47 is initially pushed downward, the radial guide 21 will enter the access-opening 13 in the wall 7 of the cartridge 1. Thereafter, the magnetic head 19 will enter the other access-opening 13 in the wall 9 of the cartridge 1 and the drive spindle 29 will enter the hole 27 in the hub 23 of the disk 11. In FIG. 1, the radial guide 21 is fixed on an underside 57 of the cover 47 and the drive spindle 29 is rotated by a conventional motor 59. A known indexing mechanism 61 driven by a suitable motor 63 translates the magnetic head 19 within the access-opening 13 in the wall 9 of the cartridge 1. The head 19 is moved radially inward across the record/playback surface 11a of the disk 11 to record and/or playback information in concentric tracks on such surface as the disk is rotated.

In accordance with the invention, the radial guide 21 includes a back 65 on which a pair of elongate, slender guide members or rails 67 and 69 for the disk 11 are mounted in a converging relation. When the radial guide 21 is received within the access-opening 13 in the wall 7 of the cartridge 1 and the cover 47 is in its horizontal position, the converging guide members 67 and 69 are disposed with a vertex V formed substantially at the center axis C of rotation of the disk 11, as shown in FIG. 2. Thus the guides members 67 and 69 are positioned substantially along respective radii R1 and R2 of the disk 11. The two radii R1 and R2 are evenly spaced on opposite sides of a third radius R3. The third radius R3 serves as a center line along which the magnetic head 19 is moved across the disk 11. As depicted in FIG. 2, the guide members 67 and 69 include an acute angle A which is bisected by the third radius R3 and defines a radially tapered space or channel S. The tapered space S extends the full length of travel of the magnetic head 19. Preferably, the included angle A is within the range of 16° to 32°, which permits the head 19 to be amply spaced from the guide members 67 and 69.

Figure 4:
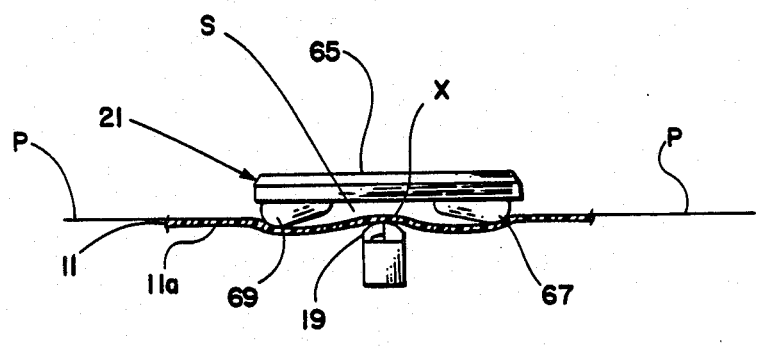
FIG. 4 is a front elevation view of the radial guide, the magnetic head and the flexible disk as shown in FIG. 3.

The converging guide members 67 and 69 are mounted on the back 65 to penetrate the plane P of revolution of the disk 11 substantially along the repsective radii R1 and R2. This causes successive radial sectors of the disk 11 which are rotated across the tapered space S to be deflected from the plane P, as shown in FIG. 4. The magnetic head 19 is positioned adjacent the plane P at a location opposite the tapered space S to urge a portion X of a radial sector of the disk 11 deflected from the plane towards the tapered space, preferably at least back to the plane. Consequently, the portion X is reverse deflected over the head 19, wrapping such portion substantially against the head and providing an intimate head-to-disk interface. In actual operation, there probably exists a thin air bearing between the portion X and the head 19, but of such minute dimension that a highly effective magnetic coupling between the two is achieved without substantial wear of the head.

The radially tapered space or channel S between the guide members 67 and 69 permits the portion X of the rotated disk 11 to conform at its outer limits with the radially directed forces along the disk. This is in contrast to prior art devices, such as described in U.S. Pat. No. 3,731,292, in which the outer limits of the portion X are constrained along parallel (non-radial) lines, thereby creating an instability of the disk in the vicinity of the head which will vary the head-to-disk spacing as the head is moved radially inward across the disk. Thus, with the invention, a more stable head-to-disk interface is achieved.

As shown in FIG. 3, the back 65 of the radial guide 21 is slightly wedge-shaped to position the guide members 67 and 69 to penetrate the plane P of the disk 11 increasingly towards the outer circumferential edge 15 of the disk, along the respective radii R1 and R2 of the disk. That is to say, the guide members 67 and 69 are inclined at a negative tilt angle T, preferably 0.3° to 0.7°, with respect to the plane P of the disk 11. This provides a greater stability of the disk 11 proximate its outer circumferential edge 15, and therefore assures a more uniform head-to-disk relation across the disk.

While the invention has been described with respect to a preferred embodiment it will be understood that various modifications may be effected within the ordinary skill in the art without departing from the scope of the invention.

I claim:

1. In a recording and/or reproducing apparatus of the type having (a) means for rotating a flexible storage disk about its center to cause the disk to revolve substantially in a plane and (b) a record and/or playback head for substantially contacting the rotated disk to record or reproduce information on the disk, the improvement comprising:
   a pair of elongate guides for the disk, said guides being mounted in a converging relation with an included acute angle defining a radially tapered channel between the guides to permit the guides to reside substantially along respective radii of a rotated disk;
   means for positioning said guides to penetrate the plane of a rotated disk substantially along respective radii of the disk to cause successive radial sectors of the disk rotated across said tapered channel to be deflected from the plane; and
   means for positioning said head to urge at least a portion of a sector of a disk, deflected from the plane, towards said tapered channel and cause a reverse deflection of the deflected portion in the vicinity of the head, whereby intimate head-to-disk interfacing is established.

2. The improvement as recited in claim 1, wherein said guides are mounted with an included acute angle within the range of 16° to 32°.

3. The improvement as recited in claim 1, wherein said positioning means for the guides positions said guides to penetrate the plane of a rotated disk increasingly towards the outer circumferential edge of the disk, substantially along respective radii of the disk, to incline the guides at a negative tilt angle with respect to the plane.

4. The improvement as recited in claim 3, wherein said positioning means for the guides positions said guides at a negative tilt angle within the range of 0.3° to 0.7°.

5. In a recording and/or reproducing apparatus of the type having (a) means for rotating a flexible storage disk about an axis through the center of the disk to cause the disk to revolve substantially in a plane and (b) a record and/or playback head for substantially contacting the rotated disk to record or reproduce information on the disk, the improvement comprising:
   a pair of elongate guides for the disk, said guides being mounted in a converging relation with a vertex proximate the axis of a rotated disk and an included acute angle defining a radially tapered channel between the guides to permit the guides to reside substantially along respective radii of the rotated disk;
   means for positioning said guides to penetrate the plane of a rotated disk substantially along respective radii of the disk and increasingly towards the outer circumferential edge of the disk to cause successive radial sectors of the disk rotated across said tapered channel to be deflected from the plane; and
   means for positioning said head adjacent the plane of a rotated disk at a location proximate said tapered channel to urge at least a portion of a sector of the disk, deflected from the plane, towards the tapered channel and cause a reverse deflection of the deflected portion in the vicinity of the head, whereby intimate head-to-disk interfacing is established.

* * * * *